July 8, 1958
G. A. LYON
2,842,403
WHEEL COVER
Filed Nov. 1, 1954
2 Sheets-Sheet 1
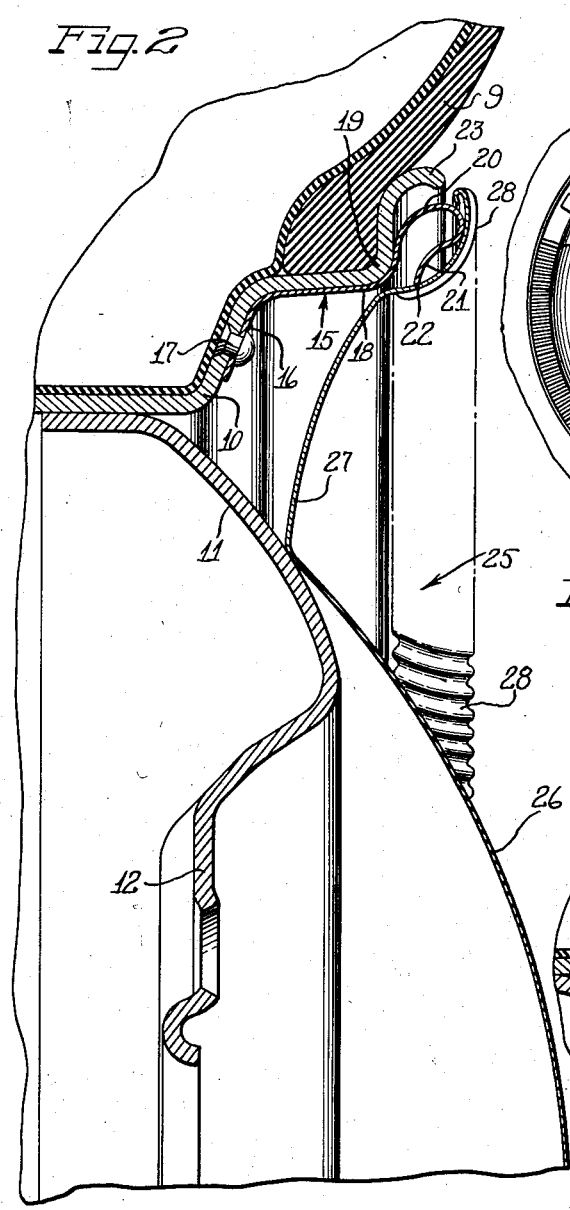
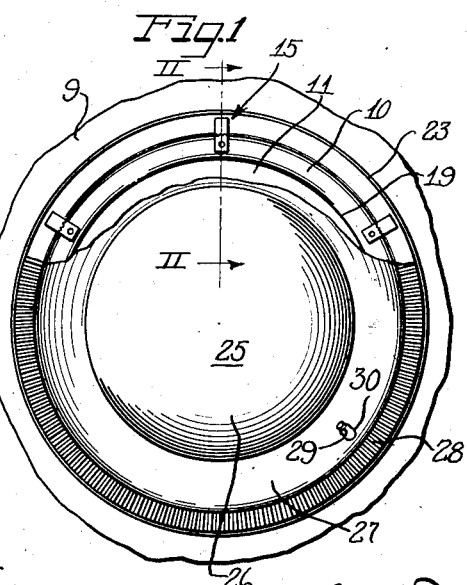
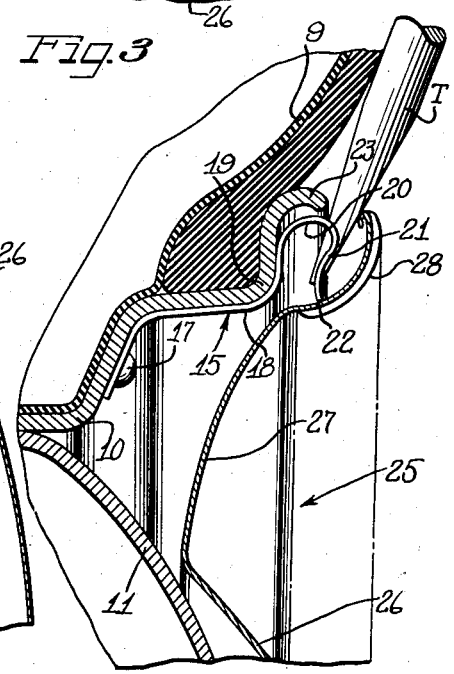
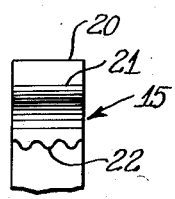
Inventor:
George Albert Lyon July 8, 1958 G. A. LYON 2,842,403
WHEEL COVER
Filed Nov. 1, 1954 2 Sheets-Sheet 2
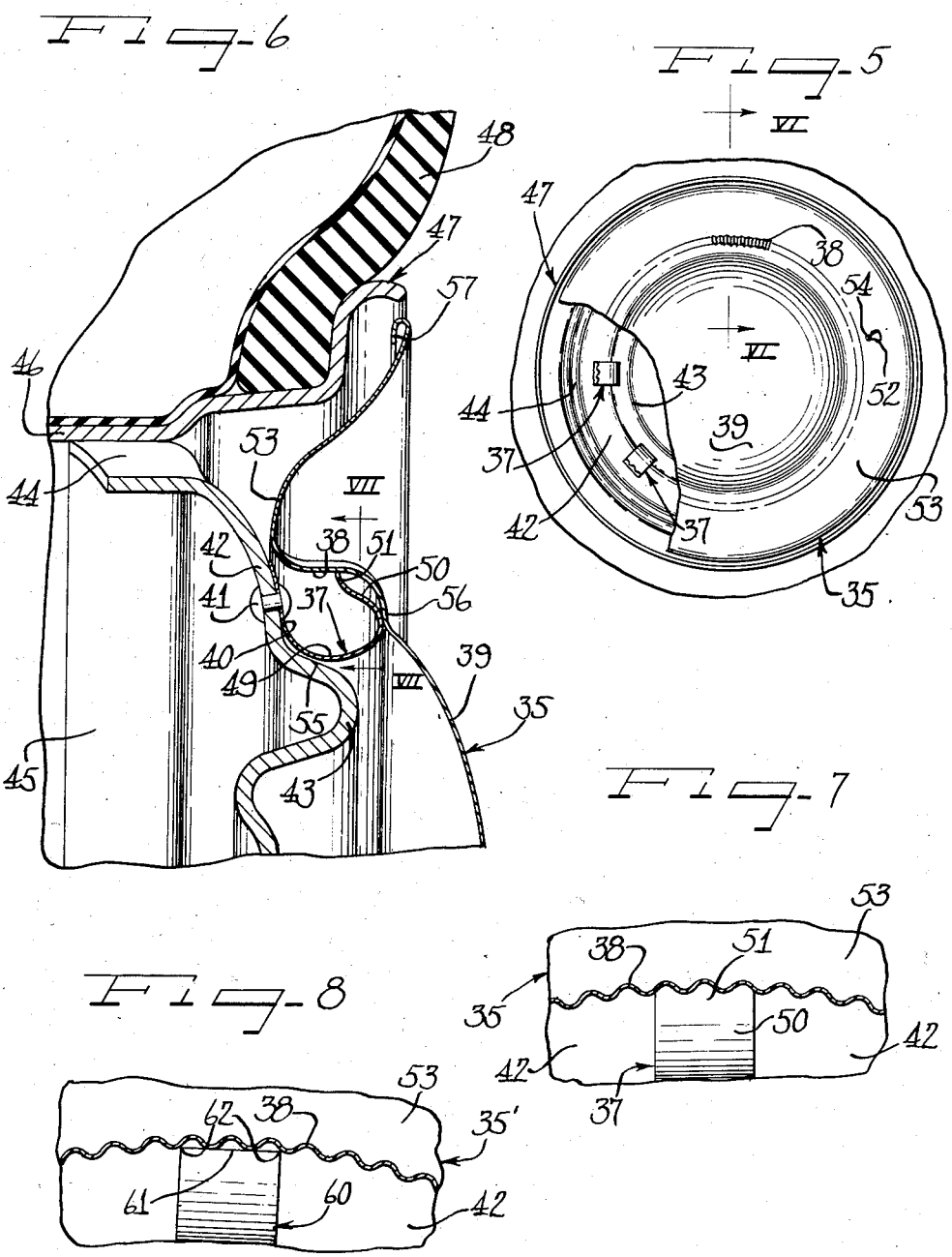
Inventor
George Albert Lyon

United States Patent Office 2,842,403
Patented July 8, 1958

2,842,403

WHEEL COVER

George Albert Lyon, Detroit, Mich.

Application November 1, 1954, Serial No. 465,962

18 Claims. (Cl. 301—37)

The present invention relates to improvements in wheel structures and more particularly concerns the ornamental and protective covering of the outer sides of vehicle wheels.

The present application is a continuation-in-part of my earlier filed applications Serial No. 264,358, filed January 2, 1952, now abandoned, and Serial No. 391,561, filed November 12, 1953, now abandoned.

An object of this invention is to provide improved means for detachably holding a cover on a wheel for not only retaining the cover in position on the wheel but also for assisting in preventing rotation of the cover.

Previously, it has been found in the retention of a wheel cover on an automobile wheel that if the wheel cover is permitted to creep or turn, it will frequently cut off the rubber valve stem and in addition is more apt to become dislodged from the wheel upon the wheel hitting a bump or obstruction in the road.

I have found that I can overcome the foregoing difficulty by an arrangement wherein the cover is retained on the wheel by means of clips engaging a shouldered area of the cover in a manner to provide a torsion interlock against turning of the cover. In one form this may be accomplished by corrugating the gripping edges of the spring clips and by providing the cover with complemental corrugations for interlocking engagement with the corrugated edges of the spring clips.

It is accordingly another object of the present invention to provide an arrangement of spring retaining clips and means on a cover for resilient, floating support and retention of the cover on the wheel but affording a torsion interlocked relation between the clips and the cover.

Other objects and features of this invention will more fully appear from the following detailed description taken in connection with the accompanying drawings which illustrate certain preferred embodiments thereof, and in which:

Figure 1 is a fragmentary outer side elevation of a wheel structure embodying features of the invention and with a portion of the cover broken away to show the spring clips;

Figure 2 is an enlarged fragmentary radial sectional view taken on substantially the line II—II of Fig. 1;

Figure 3 is a fragmentary radial sectional view similar to Fig. 2 but showing how the free legs of the clips straightened out to release the cover upon the application of a pry-off force to the outer edge of the cover;

Figure 4 is a fragmentary detail view of one of the clips showing the corrugated cover engaging edge of the same;

Figure 5 is a fragmentary outer side elevation of a wheel structure similar to Fig. 1 but showing a modification of my invention;

Figure 6 is an enlarged fragmentary radial sectional view of the modification taken on substantially the line VI—VI of Fig. 5;

Figure 7 is a fragmentary sectional detail view taken substantially on the line VII—VII of Fig. 6 and showing a fragmentary portion of one of the clips interengaging with the corrugated shoulder portion of the cover; and Figure 8 is a fragmentary sectional detail view similar to Fig. 7 showing a modification wherein the retaining tip edge of the clip is straight across.

The reference character 9 designates generally a conventional pneumatic tire and tube assembly, although it may be a tubeless tire if desired, mounted in the usual way upon a multi-flanged drop center type of tire rim 10. This tire rim is carried in the usual way upon a dished metallic wheel spider or body 11 including a central bolt-on flange 12 by means of which the wheel may be detachably fastened by means of cap screws or bolts (not shown) to a brake drum or the like on an automobile wheel axle.

Associated with the stepped flanges of the tire rim 10 is a plurality of spring clips 15 which may be of any suitable number such, for example, as 3 to 6. Each of these clips 15 is of a stepped cross section corresponding to that of the rim flanges so as to seat snugly therein and includes a leg 16 fastened as by means of a rivet 17 to the outer side flange of the rim.

It will be noted that each of the clips 15 extends around a turned flange shoulder 19 of the rim and is formed at its free end into a gooseneck-like extremity 20 having a free generally radially inwardly extending angular leg 21 the tip edge of which is provided with interlock means, in this instance comprising edgewise projection in the form of serrations or corrugations, as at 22 (Fig. 4).

Associated with the wheel for detachable gripping engagement by the tip 22 of the clip is a wheel cover 25 which may be comprised of a metallic stamping. I have attained excellent results from making this cover 25 from sheet steel such for example as stainless steel which lends itself to a very high lustrous external finish.

The cover 25 includes a central crown portion 26 and a generally divergent radially outer portion 27 terminating in a corrugated annular generally radially outwardly facing and axially extending shoulder portion 28 in which the corrugations extend generally in an axial and radial direction.

The portion 27 of the cover may be provided with an opening 30 through which the usual valve stem extremity 29 may extend.

In applying the cover 25 to the wheel, the opening 30 is first aligned with the valve stem 29 and the cover then pressed axially home toward the wheel until it bottoms on the body part 11. During this, the corrugated extremities 22 of the spring clips are brought into resilient gripping engagement with the corrugations of the portion 28. Also, due to the angle of the free leg 21 of each of the clips and the initial disposition of the extremities 22 on a smaller diameter than the diameter of the cover shoulder portion 28, the gooseneck portion 20 of the clip is caused to exert a tensioned gripping engagement on the corrugated cover shoulder portion 28.

I find that by making the corrugations 28 generally complemental to the edge projections of the edge 22 of each clip, I am able to interlock the cover with the clips so that the clips assist in resisting turning over the cover.

When it is desired to remove the cover from the wheel, the same may be very easily effected by the insertion of a pry-off tool T (Fig. 3) between the turned edge 23 of the rim and the corrugated margin of the cover. Then, by levering or twisting the pry-off tool T, the clip gooseneck portions 20 will yield resiliently to open up or straighten out to an extent sufficient to release the biting grip of the edges 22 on the corrugated shoulder portion 28, whereupon the cover can be released from the clip and removed from the wheel.

In Figs. 5, 6 and 7 there is illustrated a second species of the invention which, however, from the broad standpoint of the retention of a cover 35 on the wheel, operates in substantially the same manner as the first described embodiment. In this form it is contemplated that cover-retaining, interlocking spring clips 37 be placed in closer proximity to the center portion of the wheel as compared to the first embodiment.

It is further provided in this modified embodiment that a clip-engageable shoulder portion 38 of the cover be located on the radially outer side of a cover crown 39. Also the spring clips 37 have legs 40 fastened as by rivets 41 to a metallic wheel body spider 42 intermediate an axially outward annular nose bulge 43 on the wheel body and inset wheel openings 44 in an outer annular marginal attachment flange 44 secured to the base flange 45 of a multi-flange, drop center tire rim 47 supporting a pneumatic tire 48 which may be of the pneumatic tire and tube assembly type or a tubeless tire.

Each of the clips 37 has extending generally radially inwardly and then axially outwardly a resilient loop body portion 49 provided with a generally radially outwardly and axially inwardly projecting free cover engaging terminal leg 50 having at its generally radially outwardly directed tip 51 interlock means such as serrations or corrugations interlockingly interengageable with generally axially extending corrugations in the shoulder 38 while the edge of the tip 51 retainingly, grippingly and more or less bitingly engages the axially generally straight shoulder 38.

In applying the cover 35 to the outer side of the wheel, a valve stem aperture 52 in an annular inwardly dished intermediate portion 53 of the cover is disposed in registration with a valve stem 54. The cover is then pressed axially inwardly to cam the tips 51 of the retaining clips radially inwardly and axially outwardly along the cover shoulder 38 from the larger diameter normally described by the tips than the inside diameter of the shoulder 38. During this press-on operation, the free clip legs 50 and the resilient generally U-shaped body portions 49 of the clips yield resiliently inwardly.

Should there be a tendency for the clip bodies 49 to yield inwardly to an excessive extent, a generally radially outwardly facing shoulder 55 at the radially outer side of the nose bulge 43, disposed closely adjacent to the clip loops, is engaged by the loops and the flexure leverage of the clip loop bodies thereby sufficiently reduced during press-on to stiffen the same and stop inward movement of the clips for thereby compelling the clip tips 51 to move slidably to effective retaining, gripping engagement with the shoulder 38.

By preference, the axially outermost projecting shoulder portions of the clip loops 49 extend substantially axially outwardly beyond the tips 51 so that in the final assembled relation of the cover with respect to the clips, an annular axially inwardly facing shoulder 56 on the cover crown 39 adjacent juncture thereof with the shoulder 38, may engage as a stop upon the crowns of the clips. This relationship is preferably such that in the final assembly, the cover 35 is supported in fully floating retained engagement with the clips over the wheel, with the inwardly dished annular portion 53 close to but spaced from the wheel body to serve as a limit stop upon excessive axially inward deflection of the cover.

From the intermediate annular portion 53 the cover plate extends generally radially and axially outwardly into spaced overlying relation to the outer side of the tire rim 47 and the outer marginal extremity of the cover is turned under to provide a reinforcing and finishing bead 57. By having the outer portion of the cover spaced from the tire rim insertion of wheel balancing weights therebehind is facilitated, and also circulation of air behind the outer margin of the cover and through the wheel openings 44 is facilitated.

While the provision of complementary interlocking corrugations on the tips of the retaining spring clips 15 or 37 is highly desirable in that an exceedingly strong turn-preventing interengagement with the corrugations of the respective cover shoulders is thereby effected, it will be appreciated that the tips of less than all of the clips, such as only one of the clips, may have the corrugated tip arrangement while the remaining clips may have straight edges or simply curved edges conforming to the general peripheral curvature of the shoulder against which the tips are to engage. Alternatively one or more of the clips may, instead of having the edge provided with a plurality of corrugations or projections for interlocking with the corrugations of the cover shoulder, have a single or a plurality of projections or corners that will effectively interlock with adjacent corrugations to hold the cover against turning. For example, in the modification of Fig. 8 a cover 35' which may be in all essential respects the same as the cover 35 is retainingly engageable by clips 60 that may in all essential respects be the same as the clips 37 except that the clips 60 have substantially straight edge tips 61 provided with angular corners 62 in the nature of projections and functioning to engage against the sides of adjacent respective corrugations in the shoulder 38 to restrain the cover against turning relative to the clips and thus to the wheel.

It will be observed that the width of the clips 60 is correlated to the width of the corrugations in the shoulder 38 so that when one or more, in the present instance two, of the corrugations are retainingly gripped by the tip 61, the spur-like turn preventing corners 62 will effectively grippingly oppose the sides of the respectively adjacent corrugations. This arrangement is especially suitable where the inside curve of the cover shoulder is engaged by the tips of the clips. Where the clips are engageable with an outside curve as in the form of Fig. 2, it would be desirable to provide the tips of the clips with a corresponding concave curvature so that the corners of the clip tips will be engageable in turn-preventing relation with adjacent corrugations.

In all forms of the invention the generally axial corrugations in the clip engaged shoulders of the cover effectively reinforce the clip-engaged portions of the cover to avoid undesirable indentation of the preferably fairly thin sheet metal of which the cover is made.

It will be understood that modifications and variations may be effected without departing from the scope of the novel concepts of the present invention.

I claim as my invention:

1. In a wheel structure, a plurality of circumferentially spaced cover-retaining spring clips carried by the wheel and each having a free edge, and a cover having a portion generally axially corrugated opposite the clips and with the clip edges engaging retainingly in press-on, pry-off relation with said corrugated portion to retain the cover on the wheel.

2. In a wheel structure, a plurality of circumferentially spaced cover-retaining spring clips carried by the wheel and each having a free edge, and a cover having a portion generally axially corrugated opposite the clips and with the clip edges engaging retainingly in press-on, pry-off relation with said corrugated portion to retain the cover on the wheel, said corrugated cover portion being disposed in a radially outer margin of the cover.

3. In a wheel structure, a plurality of circumferentially spaced cover-retaining spring clips carried by the wheel and each having a free edge, and a cover having a portion generally axially corrugated opposite the clips and with the clip edges engaging retainingly in press-on, pry-off relation with said corrugated portion to retain the cover on the wheel, each of said clips being generally of a gooseneck construction with a free resilient leg terminating in said edge.

4. In a wheel including a rim with stepped flanges, a plurality of circumferentially spaced cover retaining clips carried by the wheel and each being of an angular cross section so as to fit over the stepped flanges of the rim and terminating in a free cover engaging edge with projecting means, and a cover having at least an annular portion thereof corrugated in an axial direction and disposed for receiving said spring clip edges, said edges being engageable in snap-on, pry-off relation and biting into said corrugated cover portion and said projecting means interlocking therewith to prevent turning of the cover on the wheel.

5. In a wheel structure including rim and body parts, cover retaining means secured to one of said wheel parts and having a corrugated cover retaining portion, and a cover having generally radial corrugations formed to register in press-on, pry-off relation with said corrugated cover retaining portion and for interlocking engagement therewith to prevent turning of the cover on the wheel.

6. In a wheel structure including rim and body parts, cover retaining means secured to one of said wheel parts and having a free extremity for resilient cover gripping engagement, and a cover having radial and axial corrugations, each of said cover retaining means comprising a generally gooseneck shaped spring clip with a free leg extending axially inwardly and radially and terminating in said free extremity for engagement in press-on, pry-off relation with said corrugations of the cover.

7. In a wheel structure including rim and body parts, cover retaining means secured to one of said wheel parts having a free extremity for resilient in press-on, pry-off cover gripping engagement, and a cover having radial and axial corrugations, said corrugations of the cover being disposed in a radially outer annular portion of the cover but spaced from the rim part so that air can freely circulate behind the corrugated annular portion during rotation of the wheel.

8. In a wheel structure including rim and body parts, cover retaining means secured to one of said wheel parts having a free extremity for resilient in press-on, pry-off cover gripping engagement, and a cover having generally axially extending corrugations grippingly engageable by said extremity, said spring means including a plurality of spring clips each having a gooseneck terminating in said free extremity whereby upon a pry-off force being applied to the cover edge said gooseneck flexes axially outwardly to release its extremity from gripping engagement with said cover corrugations.

9. In a wheel structure including rim and body parts, a cover having generally axially extending corrugations, and cover retaining clip means carried by one of said parts and provided with tips retainingly engageable in press-on, pry-off relation with said corrugations.

10. In a wheel structure including rim and body parts, cover retaining centrally disposed spring clips secured to said body part and having a corrugated cover retaining portion, and a cover having corrugations formed to register with said corrugated cover retaining portion in press-on, pry-off relation and for interlocking engagement therewith to prevent turning of the cover on the wheel, each of said clips being provided with a radially outer extremity formed into and comprising said corrugated portion.

11. In a wheel structure including rim and body parts, cover retaining means secured to one of said wheel parts and having a cover retaining portion with an interlock portion, and a cover having generally axially extending corrugations engageable in press-on, pry-off relation by said cover retaining portion and with which said interlock portion is interlockingly engageable to prevent turning of the cover on the wheel.

12. In a wheel structure including tire rim and body parts, the body part having an annular axially outward projection provided with a generally radially outwardly facing shoulder, spring clip means carried by the body part and having a return bent spring loop with the back thereof adjacent to said shoulder and a free cover retaining leg having its end directed generally radially outwardly, and a cover for disposition at the outer side of the wheel having a generally radially inwardly facing shoulder located to be engaged in retaining gripping engagement by the end of said leg, said clip loop being engageable with said body shoulder under compression flexure incident to application of the cover to the wheel and into engagement of said clip leg tip with said cover shoulder.

13. In a wheel structure including tire rim and body parts, looped retaining spring clips carried by one of said parts and having free ends provided with tip portions, a cover for disposition at the outer side of the wheel having a generally radially facing shoulder structure retainingly engageable by the tip portions of the clips, the loops of the clips shouldering against the cover axially outwardly of the tip-engaged shoulder of the cover and thereby resiliently supporting the cover.

14. In a wheel structure including tire rim and body parts, cover retaining spring clips having generally radially extending legs with tips thereon provided with spaced extremity corner portions, and a cover for disposition at the outer side of the wheel having a generally axially corrugated portion retainingly engageable in press-on, pry-off relation by the clip tips and with certain of the corrugations interlockingly opposing said tip corner portions for retaining the cover against turning on the wheel.

15. In a wheel structure including rim and body parts, cover retaining means secured to one of said wheel parts having a corrugated cover retaining portion, and a cover having corrugations formed to register with said corrugated cover retaining portion and for interlocking engagement therewith to prevent turning of the cover on the wheel, said cover comprising dished divergent cover portions joined by a shoulder and with said corrugations in close proximity to said shoulder.

16. In a wheel structure including rim and body parts, cover retaining means secured to one of said wheel parts having a corrugated cover retaining portion, and a cover having corrugations formed to register with said corrugated cover retaining portion and for interlocking engagement therewith to prevent turning of the cover on the wheel, said cover being dished to define a shoulder at said corrugations.

17. In a wheel structure including rim and body parts, one of said parts having a series of cover retaining spring clips circumferentially spaced and with base portions secured thereto and resilient loop portions projecting from the base portions and provided with generally axially inwardly and radially projecting retaining terminals having biting end edges extending to a circle of predetermined diameter, a cover for disposition at the outer side of the wheel having a generally axially extending annular shoulder portion facing generally radially oppositely to the direction of said biting ends and retainingly bitingly gripped thereby in press-on relation, said biting ends maintaining biting engagement with the shoulder with a generally axially inward retaining bias on the cover through said shoulder, said clip loops being yieldably openable accompanied by generally straightening of said terminals in response to pry-off force applied to the cover to release the biting grip of the biting edges.

18. A wheel structure as defined in claim 17 wherein said clip terminals are turned so that said end edges are directed more radially then axially, whereby to facilitate said pry-off release of the edges upon turning of the terminals.

References Cited in the file of this patent

UNITED STATES PATENTS

| | | |
|---|---|---|
| 2,101,923 | Stough | Dec. 14, 1937 |
| 2,308,617 | Lyon | Jan. 19, 1943 |
| 2,407,669 | Lyon | Sept. 17, 1946 |
| 2,421,385 | Lyon | June 3, 1947 |